(12) United States Patent
Xu et al.

(10) Patent No.: US 10,728,553 B2
(45) Date of Patent: Jul. 28, 2020

(54) VISUAL QUALITY PRESERVING QUANTIZATION PARAMETER PREDICTION WITH DEEP NEURAL NETWORK

(71) Applicant: SONY CORPORATION, Tokyo (JP)

(72) Inventors: Xun Xu, Cupertino, CA (US); Akira Nakamura, Yokohama (JP)

(73) Assignee: Sony Corporation, Tokyo (JP)

( * ) Notice: Subject to any disclaimer, the term of this patent is extended or adjusted under 35 U.S.C. 154(b) by 12 days.

(21) Appl. No.: 15/646,737

(22) Filed: Jul. 11, 2017

(65) Prior Publication Data

US 2019/0020871 A1    Jan. 17, 2019

(51) Int. Cl.
| | |
|---|---|
| *H04N 11/02* | (2006.01) |
| *H04N 19/124* | (2014.01) |
| *H04N 19/136* | (2014.01) |
| *H04N 19/176* | (2014.01) |
| *H04N 19/196* | (2014.01) |
| *G06N 3/08* | (2006.01) |
| *G06N 3/04* | (2006.01) |

(52) U.S. Cl.
CPC ............. *H04N 19/124* (2014.11); *G06N 3/04* (2013.01); *G06N 3/0454* (2013.01); *G06N 3/08* (2013.01); *G06N 3/084* (2013.01); *H04N 19/136* (2014.11); *H04N 19/176* (2014.11); *H04N 19/197* (2014.11)

(58) Field of Classification Search
CPC .................................................... H04N 19/124
USPC ........................................ 375/240.01–240.29
See application file for complete search history.

(56) References Cited

U.S. PATENT DOCUMENTS

| | | | | |
|---|---|---|---|---|
| 5,444,820 A | * | 8/1995 | Tzes | .................... G06N 3/0436 706/21 |
| 8,243,737 B2 | | 8/2012 | Lin et al. | |
| 2006/0280242 A1 | | 12/2006 | Ugur | |
| 2012/0269425 A1 | * | 10/2012 | Marchesotti | ........... G06K 9/036 382/159 |
| 2012/0316421 A1 | * | 12/2012 | Kumar | ............... A61B 1/00009 600/407 |
| 2013/0128122 A1 | * | 5/2013 | Wang | ..................... H04N 19/86 348/607 |
| 2013/0293725 A1 | * | 11/2013 | Zhang | .................... H04N 17/02 348/180 |

(Continued)

FOREIGN PATENT DOCUMENTS

| | | |
|---|---|---|
| EP | 1280107 A2 | 1/2003 |
| WO | 2016150472 A1 | 9/2016 |
| WO | 2017155786 A1 | 9/2017 |

OTHER PUBLICATIONS

Liu, L. "HEp-2 cell image classification with multiple linear descriptors", University of Wollongong Australia.

(Continued)

*Primary Examiner* — Leron Beck
(74) *Attorney, Agent, or Firm* — Haverstock & Owens LLP

(57) ABSTRACT

A QP mapping method is capable of preserving consistent visual quality across the encoded frame. It automatically assigns more bits to image blocks which are more sensitive to compression distortion. The texture-descriptive features employed for QP prediction are fast to compute and, together with a deep neural network, are able to effectively approximate the underlying QP mapping strategy deduced from a visual quality measure.

21 Claims, 2 Drawing Sheets

(56) References Cited

U.S. PATENT DOCUMENTS

| | | | | |
|---|---|---|---|---|
| 2015/0030219 A1* | 1/2015 | Madabhushi | ............ | G06T 7/149 382/128 |
| 2015/0193947 A1* | 7/2015 | Sharma | ................ | G06T 7/0004 382/264 |
| 2015/0195575 A1* | 7/2015 | Jeong | ................... | H04N 19/124 382/233 |
| 2015/0238148 A1* | 8/2015 | Georgescu | ........... | A61B 5/7267 600/408 |
| 2015/0294191 A1* | 10/2015 | Zhang | ................... | G06N 20/00 382/160 |
| 2015/0324655 A1* | 11/2015 | Chalasani | ............ | G06K 9/6272 382/103 |
| 2016/0328646 A1* | 11/2016 | Lin | .......................... | G06N 3/08 |

OTHER PUBLICATIONS

Luo, Heng, Texture Modeling with Convolutional Spike-and Slab RBMs and Deep Extensions.

Lazebnik, Svetlana, "Beyond Bags of Features: Spatial Pyramid Matching for Recognizing Natural Scene Categories", IEE Computer Society, 2006.

Begiom Yosua, "Learning Deep Architectures for AI", Technical Report 1312.

Rumelhart, David E., "Learning representations by back-propagating errors", Nature vol. 323, Oct. 1986.

Haralick, Robert M., "Textural Features for Image Classification", IEEE Transactions on Systems, vol. SMC-3, No. 6, Nov. 1973, pp. 610-621.

The Invitation to Pay Additional Fees and, Where Applicable, Protest Fee for PCT Patent Application No. PCT/IB2018/054832, dated Oct. 5, 2018.

Jianying Zhu et al., "A Novel Quantization Parameter Estimation Model Basedo N Neural Network", Systems and Informatics (ICSAI), 2012 International Conference on, IEEE, May 19, 2012 (May 19, 2012), pp. 2020-2023, XP032192926, D0I: 10.1109/ICSAI.2012. 6223448, ISBN: 978-1-4673-0198-5.

Liu Xin et al., "Spatial Complexity Based Optimal Initial Quantization Parameter Determination," 2015 Visual Communications and Image Processing (VCIP), IEEE, Dec. 13, 2015 (Dec. 13, 2015), pp. 1-4, XP032894168, D0I: 10.1109 (VCIP).2015.7457913 [retrieved on Apr. 21, 2016].

Fleury P. et al."Neural Network Based Image Coding Quality Prediction", IEEE International Conference on Acoustics, Speech, and Signal Processing, 1997, ICASSP-97, Munich, Germany Apr. 21-24, Los Alamitos, CA, USA, IEEE Comput. Soc; US, US. vol. 4, Apr. 21, 1997 (Apr. 21, 1997), pp. 3413-3416, XP010225891, D0I: 10.1109/ICASSP.1997.595527, ISBN: 978-0-8186-7919-3.

Timothy Masters:, "2. Classification. 3. Autoassocation (part), 6. Multilayer Feedforward Networks", In: "Practical Neural Network Recipes in C++", Mar. 31, 1993 (Mar. 31, 1993), Elsevier, XP055508276, ISBN: 978-0-08-051433-8,pp. 15-24 and 77-116.

* cited by examiner

VISUAL QUALITY PRESERVING QUANTIZATION PARAMETER PREDICTION WITH DEEP NEURAL NETWORK

FIELD OF THE INVENTION

The present invention relates to video encoding. More specifically, the present invention relates to quantization parameter prediction in video encoding.

BACKGROUND OF THE INVENTION

In video encoding, Quantization Parameter (QP) is the parameter deciding how many bits should be allocated to encode each coding unit (image block). Conventionally QP is often assigned globally, resulting in a uniform bit allocation strategy. However, this strategy leads to inconsistent visual quality because different image blocks vary in the ability to conceal distortion caused by compression.

SUMMARY OF THE INVENTION

A QP mapping method is capable of preserving consistent visual quality across the encoded frame. It automatically assigns more bits to image blocks which are more sensitive to compression distortion. The texture-descriptive features employed for QP prediction are fast to compute and, together with a deep neural network, are able to effectively approximate the underlying QP mapping strategy deduced from a visual quality measure.

In one aspect, a method programmed in a non-transitory memory of a device comprises acquiring video content, extracting image features from the video content, feeding the image features through a deep neural network and predicting a target quantization parameter value, wherein the target quantization parameter value corresponds to the node with a highest activation value. The deep neural network is first pre-trained without supervision using image features extracted from training image blocks. Pre-training uses an auto-encoder framework, wherein network parameters are tuned to reconstruct training input. The method further comprises improving the neural network by inputting image features and their assigned quantization parameter values using a back-propagation algorithm. The image features include: Haralick texture descriptors, total-variation and variance. Extracting the image features is performed using a spatial pyramid framework to extract the image features at various granularities. The spatial pyramid framework includes: sequentially dividing an image block into a series of grids of smaller sub-images, for each of the grids, the image features are extracted for every sub-image, then the image features are concatenated into a final feature vector that is input into the neural network.

In another aspect, a system comprises a lens, a sensor configured for acquiring video content and a processing component configured for extracting image features from the video content, feeding the image features through a deep neural network and predicting a target quantization parameter value, wherein the target quantization parameter value corresponds to the node with a highest activation value. The deep neural network is first pre-trained without supervision using image features extracted from training image blocks. Pre-training uses an auto-encoder framework, wherein network parameters are tuned to reconstruct training input. The processing component is further for improving the neural network by inputting image features and their assigned quantization parameter values using a back-propagation algorithm. The image features include: Haralick texture descriptors, total-variation and variance. Extracting the image features is performed using a spatial pyramid framework to extract the image features at various granularities. The spatial pyramid framework includes: sequentially dividing an image block into a series of grids of smaller sub-images, for each of the grids, the image features are extracted for every sub-image, then the image features are concatenated into a final feature vector that is input into the neural network.

In another aspect, a camera device comprises a lens, a sensor configured for acquiring video content, a non-transitory memory for storing an application, the application for: extracting image features from the video content, feeding the image features through a deep neural network and predicting a target quantization parameter value, wherein the target quantization parameter value corresponds to the node with a highest activation value and a processing component coupled to the memory, the processing component configured for processing the application. The deep neural network is first pre-trained without supervision using image features extracted from training image blocks. Pre-training uses an auto-encoder framework, wherein network parameters are tuned to reconstruct training input. The application is further for improving the neural network by inputting image features and their assigned quantization parameter values using a back-propagation algorithm. The image features include: Haralick texture descriptors, total-variation and variance. Extracting the image features is performed using a spatial pyramid framework to extract the image features at various granularities. The spatial pyramid framework includes: sequentially dividing an image block into a series of grids of smaller sub-images, for each of the grids, the image features are extracted for every sub-image, then the image features are concatenated into a final feature vector that is input into the neural network.

In another aspect, a method programmed in a non-transitory memory of a device comprises acquiring video content, compressing each image block of the video content using quantization parameters starting at a quantization parameter of 0 and increasing the quantization parameter until a quality measure of the compressed image block is below a visual quality threshold and utilizing the quantization parameter just preceding the quantization parameter with the quality measure of the compressed image block below the visual quality threshold as the visual quality preserving quantization parameter. The visual quality threshold is pre-selected.

In another aspect, a system comprises a lens, a sensor configured for acquiring video content and a processing component configured for compressing each image block of the video content using quantization parameters starting at a quantization parameter of 0 and increasing the quantization parameter until a quality measure of the compressed image block is below a visual quality threshold and utilizing the quantization parameter just preceding the quantization parameter with the quality measure of the compressed image block below the visual quality threshold as the visual quality preserving quantization parameter. The visual quality threshold is pre-selected.

In another aspect, a camera device comprises a lens, a sensor configured for acquiring video content, a non-transitory memory for storing an application, the application for: compressing each image block of the video content using quantization parameters starting at a quantization parameter of 0 and increasing the quantization parameter until a quality measure of the compressed image block is below a visual quality threshold and utilizing the quantization parameter just preceding the quantization parameter with the quality measure of the compressed image block below the visual quality threshold as the visual quality preserving quantization parameter and a processing component coupled to the memory, the processing component configured for processing the application. The visual quality threshold is pre-selected.

DETAILED DESCRIPTION OF THE PREFERRED EMBODIMENT

A framework to assign Quantization Parameter (QP) parameters to image blocks with the capability of preserving visual quality across encoded frames is described. A fast, automatic QP prediction algorithm based on a deep neural network is described. Various effective image features are used in the prediction algorithm.

In video encoding, Quantization Parameter (QP) is the parameter deciding how many bits should be allocated to encode each coding unit (image block). The parameters are important in the video encoding procedure, as they directly affect the eventual quality of the encoded video.

Conventionally QP is assigned globally, resulting in a uniform bit allocation strategy. This strategy does not take into consideration the visual properties of different image blocks. Due to their various visual appearances, different image blocks vary in the ability to conceal distortion caused by compression. As a result, some image blocks are more sensitive to compression (e.g., the compression artifacts are easier to be observed in these blocks); therefore, the image blocks should be allocated with more bits to encode, or equivalently, assigned lower QPs.

A more reasonable strategy for QP assignation is to preserve a uniform visual quality, instead of a uniform bit number. An automatic algorithm to assign QP parameters, e.g., map each image block to a QP value, is described, which is able to preserve visual quality.

Visual Quality Preserving QP Mapping

In order to design a QP mapping strategy able to preserve visual quality, an approach to visual quality assessment (VQA) is used. Given an original image and a distorted image (e.g., a compressed image), such a VQA algorithm is able to measure the quality of the distorted image. Without losing generality, it is assumed an algorithm rates the visual quality as a real number ranging from 0 (low quality) to 1 (high quality). The framework described herein is able to use any VQA algorithm. One VQA algorithm is Feature Similarity Index Model (FSIM). The FSIM algorithm is fast to compute and achieves reasonably good visual quality measurement.

Figure 1:
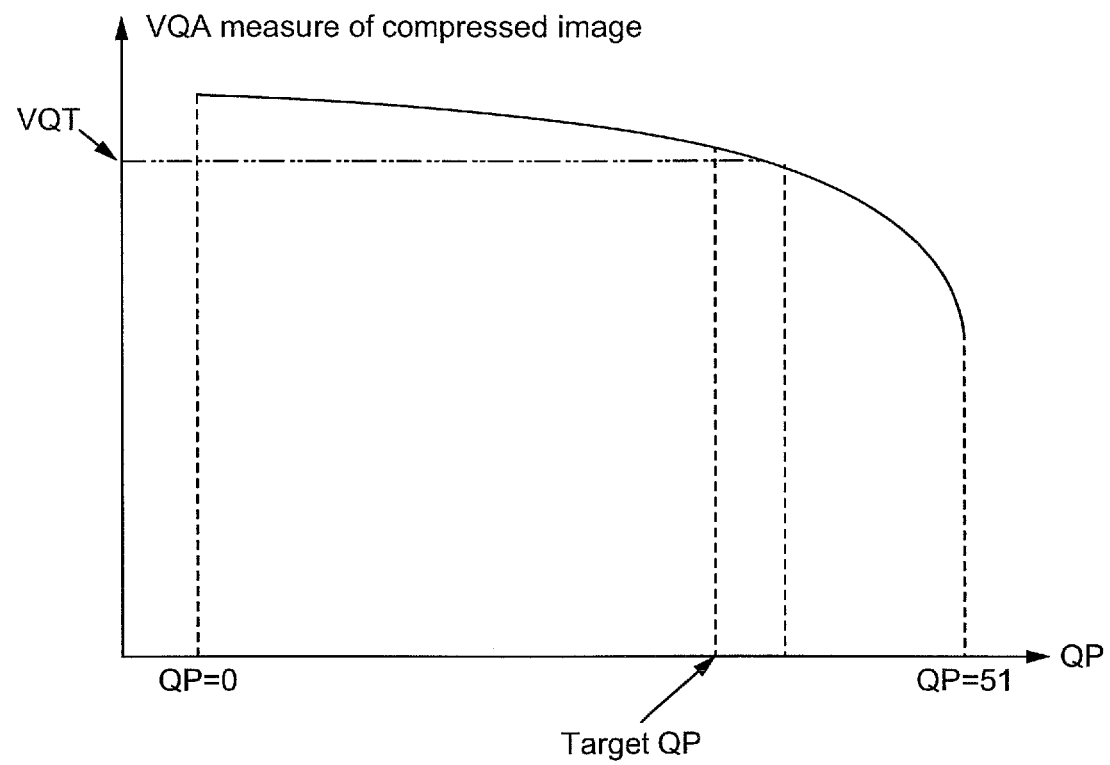
FIG. 1 illustrates a diagram of a visual quality preserving QP assignation according to some embodiments.

A pre-selected Visual Quality Threshold (VQT) is first selected as a number between 0 and 1, e.g., 0.95, although any range/number is able to be used. Then, for each given input image block (from the original video frame to be compressed), it is compressed at all possible QPs (an integer value ranging from 0 through 51). As QP increases, generally the visual quality measure drops (not necessarily monotonous though). The QP just preceding when the quality measure first drops below the VQT is determined as the visual quality preserving QP (e.g., the target QP used for training the neural network). FIG. 1 illustrates a diagram of a visual quality preserving QP assignation.

The procedure is performed for all image blocks in a video frame, mapping them to a map of visual quality preserving QPs.

QP Map Prediction with Deep Neural Network

Figure 2:
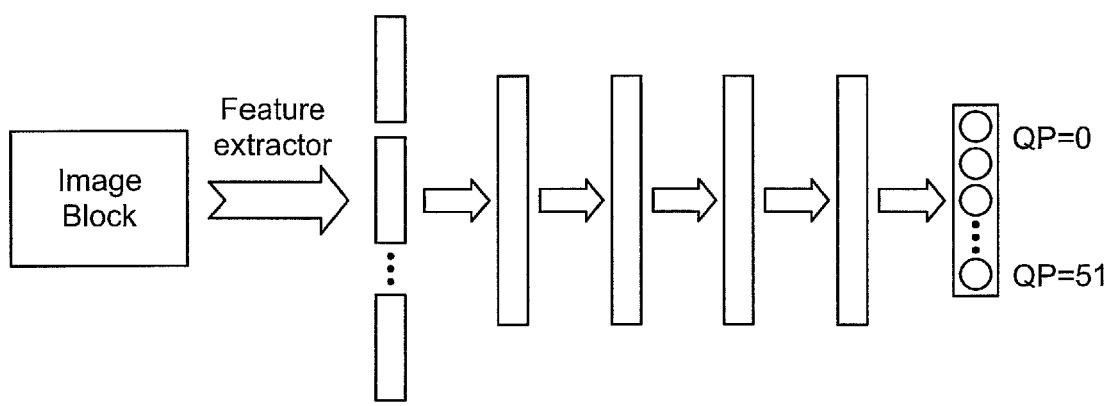
FIG. 2 illustrates a diagram of a QP Prediction Neural Network according to some embodiments.

The QP mapping procedure is able to be performed directly within the video encoding workflow. Another approach is to find a fast algorithm that is able to approximate such QP mapping strategy. To this end, a deep neural network is employed, as show in FIG. 2. The input layer of the network includes image features extracted from the input image block using a feature extractor. The features are described herein. The output layer of the network is composed of 52 nodes (e.g., QP=0, . . . , QP=51), each corresponding to one of the possible QP values. The output nodes have an activation value between −1 and 1, and the one with highest activation predicts the target QP value.

The QP prediction network is pre-trained first in an unsupervised fashion, being fed a large amount of image features extracted from training image blocks. The pre-training is performed using the auto-encoder framework, where the network parameters are tuned to be able to best reconstruct the training inputs. Then, the network is further improved by feeding a large amount of pairs of image features and their assigned QP values due to the strategy described herein. A back-propagation algorithm is used to achieve this.

Image Features for QP Prediction Neural Network

Three different types of image features compose the input layer of the QP prediction neural network: Haralick texture descriptors, total-variation and variance. The 13-dimensional Haralick texture descriptors are the classic features extracting textural information from the input image. The Haralick texture descriptors are computed from the gray level co-occurrence matrix (GLCM). Total-variation and variance features are statistics of the pixel values within the image being processed.

A spatial pyramid framework is used to extract image features at various granularities. The input image block is divided, sequentially, into a series of grids of smaller sub-images. The grids are of sizes 1×1 (original image block), 2×2, 4×4 and 8×8. For each of these grids, the image features described herein are extracted for every sub-image, then these sub-features are concatenated into the final feature vector that is fed into the QP prediction neural network.

Figure 3:
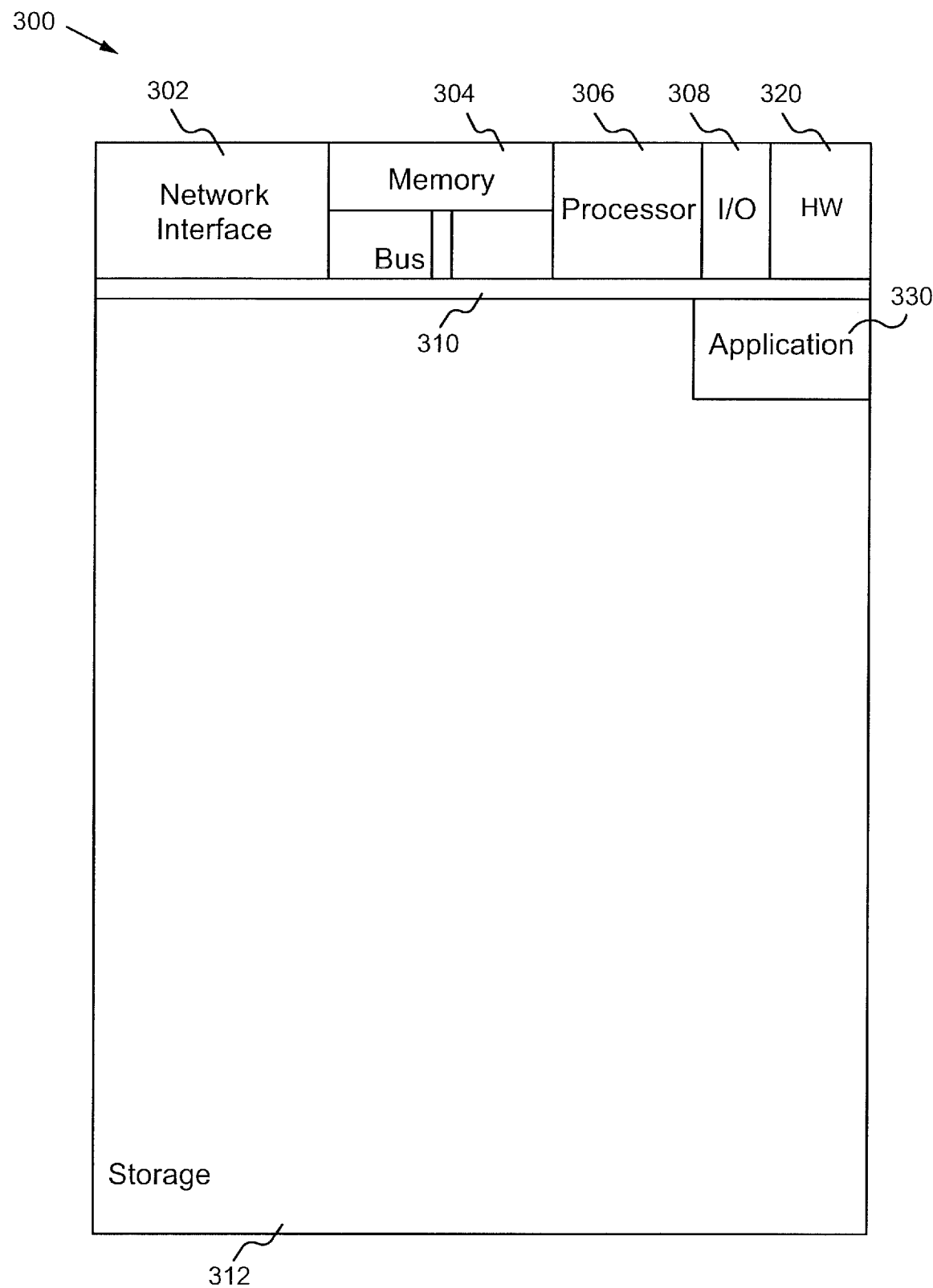
FIG. 3 illustrates a block diagram of an exemplary computing device configured to implement the QP mapping method according to some embodiments.

FIG. 3 illustrates a block diagram of an exemplary computing device configured to implement the QP mapping method according to some embodiments. The computing device 300 is able to be used to acquire, store, compute, process, communicate and/or display information such as images and videos. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, High Definition disc/drive, ultra-HD drive, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, screen, printer, modem, touchscreen, button interface and other devices. QP mapping application(s) 330 used to perform the lens-sensor tilt calibration method are likely to be stored in the storage device 312 and memory 304 and processed as applications are typically processed. More or fewer components shown in FIG. 3 are able to be included in the computing device 300. In some embodiments, QP mapping hardware 320 is included. Although the computing device 300 in FIG. 3 includes applications 330 and hardware 320 for the QP mapping method, the QP mapping method is able to be implemented on a computing device in hardware, firmware, software or any combination thereof. For example, in some embodiments, the QP mapping applications 330 are programmed in a memory and executed using a processor. In another example, in some embodiments, the QP mapping hardware 320 is programmed hardware logic including gates specifically designed to implement the QP mapping method.

In some embodiments, the QP mapping application(s) 330 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

To utilize the QP mapping method described herein, a device such as a digital camcorder is used to acquire a video. The QP mapping method is automatically used for processing the acquired data. The QP mapping method is able to be implemented automatically without user involvement.

In operation, the QP mapping method is capable of preserving consistent visual quality across the encoded frame. It automatically assigns more bits to image blocks which are more sensitive to compression distortion. The texture-descriptive features employed for QP prediction are fast to compute and are able to effectively approximate the underlying QP mapping strategy deduced from a visual quality measure.

Some Embodiments of Visual Quality Preserving Quantization Parameter Prediction with Deep Neural Network 1. A method programmed in a non-transitory memory of a device comprising:
   a. acquiring video content;
   b. extracting image features from the video content;
   c. feeding the image features through a deep neural network; and
   d. predicting a target quantization parameter value, wherein the target quantization parameter value corresponds to the node with a highest activation value.
2. The method of clause 1 wherein the deep neural network is first pre-trained without supervision using image features extracted from training image blocks.
3. The method of clause 2 wherein pre-training uses an auto-encoder framework, wherein network parameters are tuned to reconstruct training input.
4. The method of clause 1 further comprising improving the neural network by inputting image features and their assigned quantization parameter values using a back-propagation algorithm.
5. The method of clause 1 wherein the image features include: Haralick texture descriptors, total-variation and variance.
6. The method of clause 1 wherein extracting the image features is performed using a spatial pyramid framework to extract the image features at various granularities.
7. The method of clause 6 wherein the spatial pyramid framework includes: sequentially dividing an image block into a series of grids of smaller sub-images, for each of the grids, the image features are extracted for every sub-image, then the image features are concatenated into a final feature vector that is input into the neural network.
8. A system comprising:
   a. a lens;
   b. a sensor configured for acquiring video content; and
   c. a processing component configured for extracting image features from the video content, feeding the image features through a deep neural network and predicting a target quantization parameter value, wherein the target quantization parameter value corresponds to the node with a highest activation value.
9. The system of clause 8 wherein the deep neural network is first pre-trained without supervision using image features extracted from training image blocks.
10. The system of clause 9 wherein pre-training uses an auto-encoder framework, wherein network parameters are tuned to reconstruct training input.
11. The system of clause 8 wherein the processing component is further for improving the neural network by inputting image features and their assigned quantization parameter values using a back-propagation algorithm.
12. The system of clause 8 wherein the image features include: Haralick texture descriptors, total-variation and variance.
13. The system of clause 8 wherein extracting the image features is performed using a spatial pyramid framework to extract the image features at various granularities.
14. The system of clause 13 wherein the spatial pyramid framework includes: sequentially dividing an image block into a series of grids of smaller sub-images, for each of the grids, the image features are extracted for every sub-image, then the image features are concatenated into a final feature vector that is input into the neural network.
15. A camera device comprising:
   a. a lens;
   b. a sensor configured for acquiring video content;
   c. a non-transitory memory for storing an application, the application for:
      i. extracting image features from the video content;
      ii. feeding the image features through a deep neural network; and
      iii. predicting a target quantization parameter value, wherein the target quantization parameter value corresponds to the node with a highest activation value; and
   d. a processing component coupled to the memory, the processing component configured for processing the application.

16. The camera device of clause 15 wherein the deep neural network is first pre-trained without supervision using image features extracted from training image blocks.
17. The camera device of clause 16 wherein pre-training uses an auto-encoder framework, wherein network parameters are tuned to reconstruct training input.
18. The camera device of clause 15 wherein the application is further for improving the neural network by inputting image features and their assigned quantization parameter values using a back-propagation algorithm.
19. The camera device of clause 15 wherein the image features include: Haralick texture descriptors, total-variation and variance.
20. The camera device of clause 15 wherein extracting the image features is performed using a spatial pyramid framework to extract the image features at various granularities.
21. The camera device of clause 20 wherein the spatial pyramid framework includes: sequentially dividing an image block into a series of grids of smaller sub-images, for each of the grids, the image features are extracted for every sub-image, then the image features are concatenated into a final feature vector that is input into the neural network.
22. A method programmed in a non-transitory memory of a device comprising:
    a. acquiring video content;
    b. compressing each image block of the video content using quantization parameters starting at a quantization parameter of 0 and increasing the quantization parameter until a quality measure of the compressed image block is below a visual quality threshold; and
    c. utilizing the quantization parameter just preceding the quantization parameter with the quality measure of the compressed image block below the visual quality threshold as the visual quality preserving quantization parameter.
23. The method of clause 22 wherein the visual quality threshold is pre-selected.
24. A system comprising:
    a. a lens;
    b. a sensor configured for acquiring video content; and
    c. a processing component configured for compressing each image block of the video content using quantization parameters starting at a quantization parameter of 0 and increasing the quantization parameter until a quality measure of the compressed image block is below a visual quality threshold and utilizing the quantization parameter just preceding the quantization parameter with the quality measure of the compressed image block below the visual quality threshold as the visual quality preserving quantization parameter.
25. The system of clause 24 wherein the visual quality threshold is pre-selected.
26. A camera device comprising:
    a. a lens;
    b. a sensor configured for acquiring video content;
    c. a non-transitory memory for storing an application, the application for:
        i. compressing each image block of the video content using quantization parameters starting at a quantization parameter of 0 and increasing the quantization parameter until a quality measure of the compressed image block is below a visual quality threshold; and
        ii. utilizing the quantization parameter just preceding the quantization parameter with the quality measure of the compressed image block below the visual quality threshold as the visual quality preserving quantization parameter; and
    d. a processing component coupled to the memory, the processing component configured for processing the application.
27. The camera device of clause 26 wherein the visual quality threshold is pre-selected.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a device comprising:
    a. acquiring video content;
    b. extracting image features from the video content;
    c. feeding the image features through a deep neural network; and
    d. predicting a target quantization parameter value, wherein the target quantization parameter value corresponds to a node with a highest activation value, wherein an output layer comprises 52 nodes, each node corresponding to one of the quantization parameter values.
2. The method of claim 1 wherein the deep neural network is first pre-trained without supervision using image features extracted from training image blocks.
3. The method of claim 2 wherein pre-training uses an auto-encoder framework, wherein network parameters are tuned to reconstruct training input.
4. The method of claim 1 further comprising improving the neural network by inputting image features and their assigned quantization parameter values using a back-propagation algorithm.
5. The method of claim 1 wherein the image features include: Haralick texture descriptors, total-variation and variance.
6. The method of claim 1 wherein extracting the image features is performed using a spatial pyramid framework to extract the image features at various granularities.
7. The method of claim 6 wherein the spatial pyramid framework includes:
    sequentially dividing an image block into a series of grids of smaller sub-images, for each of the grids, the image features are extracted for every sub-image, then the image features are concatenated into a final feature vector that is input into the neural network.
8. A system comprising:
    a. a lens;
    b. a sensor configured for acquiring video content; and
    c. a processing component configured for extracting image features from the video content, feeding the image features through a deep neural network and predicting a target quantization parameter value, wherein the target quantization parameter value corresponds to a node with a highest activation value, wherein an output layer comprises 52 nodes, each node corresponding to one of the quantization parameter values.

9. The system of claim 8 wherein the deep neural network is first pre-trained without supervision using image features extracted from training image blocks.

10. The system of claim 9 wherein pre-training uses an auto-encoder framework, wherein network parameters are tuned to reconstruct training input.

11. The system of claim 8 wherein the processing component is further for improving the neural network by inputting image features and their assigned quantization parameter values using a back-propagation algorithm.

12. The system of claim 8 wherein the image features include: Haralick texture descriptors, total-variation and variance.

13. The system of claim 8 wherein extracting the image features is performed using a spatial pyramid framework to extract the image features at various granularities.

14. The system of claim 13 wherein the spatial pyramid framework includes:
sequentially dividing an image block into a series of grids of smaller sub-images, for each of the grids, the image features are extracted for every sub-image, then the image features are concatenated into a final feature vector that is input into the neural network.

15. A camera device comprising:
a. a lens;
b. a sensor configured for acquiring video content;
c. a non-transitory memory for storing an application, the application for:
 i. extracting image features from the video content;
 ii. feeding the image features through a deep neural network; and
 iii. predicting a target quantization parameter value, wherein the target quantization parameter value corresponds to a node of a plurality of nodes with a highest activation value based on a comparison of activation values of each node of the plurality of nodes, wherein an output layer of the application comprises 52 nodes, each node corresponding to one of the quantization parameter values, wherein each node has an activation value between −1 and 1; and
d. a processing component coupled to the memory, the processing component configured for processing the application.

16. The camera device of claim 15 wherein the deep neural network is first pre-trained without supervision using image features extracted from training image blocks.

17. The camera device of claim 16 wherein pre-training uses an auto-encoder framework, wherein network parameters are tuned to reconstruct training input.

18. The camera device of claim 15 wherein the application is further for improving the neural network by inputting image features and their assigned quantization parameter values using a back-propagation algorithm.

19. The camera device of claim 15 wherein the image features include:
Haralick texture descriptors, total-variation and variance.

20. The camera device of claim 15 wherein extracting the image features is performed using a spatial pyramid framework to extract the image features at various granularities.

21. The camera device of claim 20 wherein the spatial pyramid framework includes: sequentially dividing an image block into a series of grids of smaller sub-images, for each of the grids, the image features are extracted for every sub-image, then the image features are concatenated into a final feature vector that is input into the neural network.

* * * * *